United States Patent
Trawick

(10) Patent No.: US 11,319,880 B2
(45) Date of Patent: May 3, 2022

(54) ELECTRICAL CONTROLLER FOR ENGINE-DRIVEN ELECTRIC MACHINE

(71) Applicant: Rolls-Royce North American Technologies, Inc., Indianapolis, IN (US)

(72) Inventor: David Russell Trawick, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 560 days.

(21) Appl. No.: 16/171,847

(22) Filed: Oct. 26, 2018

(65) Prior Publication Data

US 2020/0131995 A1 Apr. 30, 2020

(51) Int. Cl.
*F02C 7/26* (2006.01)
*F02C 9/56* (2006.01)
*G01M 15/14* (2006.01)

(52) U.S. Cl.
CPC .............. *F02C 7/26* (2013.01); *F02C 9/56* (2013.01); *G01M 15/14* (2013.01)

(58) Field of Classification Search
None
See application file for complete search history.

(56) References Cited

U.S. PATENT DOCUMENTS

| | | |
|---|---|---|
| 2,882,615 A | 4/1959 | Dawson, Jr. |
| 7,717,668 B2 | 5/2010 | Son et al. |
| 2017/0248080 A1* | 8/2017 | Chevalier ............... F02C 7/275 |
| 2019/0360462 A1* | 11/2019 | Epstein ................... F03D 7/045 |
| 2020/0063599 A1* | 2/2020 | Waun ...................... B64D 27/02 |
| 2021/0067065 A1* | 3/2021 | Wang ....................... H02P 3/22 |

OTHER PUBLICATIONS

Britannica (Year: 1999).*
Sridhara et al., "Automotive-Turbocharger Based Gas Turbine Engine Used to Produce Electricity", International Journal of Scientific and Research Publications, vol. 6, Issue 8, Aug. 2016, 20 pgs.

(Continued)

*Primary Examiner* — Arun Goyal
*Assistant Examiner* — William L Breazeal
(74) *Attorney, Agent, or Firm* — Shumaker & Sieffert, P.A.

(57) ABSTRACT

The disclosure describes a system that includes an engine having a shaft that rotates around an axis of rotation, an engine controller configured to control the engine, an electric machine mechanically coupled to the shaft of the engine, and an electrical controller. The engine controller is configured to control the engine using control techniques configured for a mechanical device having a target moment of inertia around the axis of rotation. The electric machine has an actual moment of inertia around the axis of rotation that is different from the target moment of inertia. To supplement control of the engine due to the difference in moments of inertia, the electrical controller is configured to receive a rotational speed of the shaft, determine a torque for the shaft based on the speed of the shaft, and control the electric machine to apply the torque to the shaft.

18 Claims, 4 Drawing Sheets

(56) References Cited

OTHER PUBLICATIONS

Li et al., "An approach of inertia compensation based on electromagnetic induction in brake test", IJACSA, vol. 7, No. 4, 2016, 6 pgs., Applicant points out, in accordance with MPEP 609.04(a), that the year of publication, 2016, is sufficiently earlier than the effective U.S. filing date, 2018, so that the particular month of publication is not in issue.

Roumeliotis et al., "Assessment of the Conversion of a Helicopter Engine for Electrical Power Production", Jan. 2014, Retrieved from https://www.researchgate.net/publication/308029984, 16 pgs.

Meyer et al., "Gas Turbine Engine Behavioral Modeling", ECE Technical Reports, Purdue e-Pubs, Jan. 8, 2014, 46 pgs.

2018 Power Services Catalog, http://www.geenergytechnicaltraining.com/, 111 pgs., Applicant points out, in accordance with MPEP 609.04(a), that the year of publication, 2018, is sufficiently earlier than the effective U.S. filing date, 2018, so that the particular month of publication is not in issue.

GE Controller Card Fact Sheet, http://www.gemeasurement.com, Apr. 2016, 1 pg.

Chapman et al., "Practical Techniques for Modeling Gas Turbine Engine Performance", Retrieved from https://ntrs.nasa.gov/search.jsp?R=20170000884 2018-08-29T16:12:04+00:00Z, Jul. 25, 2016, 20 pgs.

Gaspari et al., "D1.1: Concept of Modular Architecture for Hybrid Electric Propulsion of Aircraft", Dec. 2017, 87 pgs.

Brelje et al., "Electric, Hybrid, and Turboelectric Fixed-Wing Aircraft: A Review of Concepts, Models, and Design Approaches", Jun. 2018, 38 pgs.

\* cited by examiner

ELECTRICAL CONTROLLER FOR ENGINE-DRIVEN ELECTRIC MACHINE

TECHNICAL FIELD

The disclosure relates to methods and systems for controlling a power generation system.

BACKGROUND

Some full authority digital engine control (FADEC) systems are adapted as engine control units or controllers provide comprehensive control of engines, such as a gas turbine engines and the like. When configured as an engine control unit or controller, a FADEC system may be specific to and certified only for a particular engine or engine model that the FADEC system has been targeted or designed to control. For example, a FADEC controller that controls a gas turbine engine to drive a machine may take into account operating characteristics and behaviors of both the engine and the machine as each relates to control of the gas turbine engine. For example, the FADEC controller may use feedback from sensors on a shaft of the engine to control actuators that provide fuel, and thus power, to the engine. To ensure that the FADEC controller is capable of controlling the gas turbine engine under a variety of circumstances, the FADEC controller may undergo costly testing and/or certification. For example, the FADEC controller may be certified for operation across a variety of flight envelopes that have associated safety limits, such as acceleration limits for the shafts of the engine.

SUMMARY

In some examples, the disclosure describes a method that includes receiving, by an electrical controller and from an engine controller, a rotational speed of a shaft of an engine coupled to an electric machine. The shaft rotates about an axis of rotation. The engine controller is configured to control the engine using control techniques configured for a propulsor having a target moment of inertia around the axis of rotation. The method further includes determining, by the electrical controller, a torque for the shaft based on the rotational speed of the shaft and the target moment of inertia. The method further includes controlling, by the electrical controller, the electric machine to apply the torque to the shaft. The electric machine has an actual moment of inertia around the axis of rotation that is different from the target moment of inertia.

In other examples, the disclosure describes a system that includes an engine, an engine controller, an electrical machine, and an electrical controller. The engine comprising a shaft that rotates around an axis of rotation. The engine controller is configured to control the shaft of the engine for a propulsor having a target moment of inertia around the axis of rotation. The electric machine is coupled to the shaft and has an actual moment of inertia around the axis of rotation that is different from the target moment of inertia. The electric machine controller is configured to receive, from the engine controller, a rotational speed of the shaft, determine a torque for the shaft based on the speed of the shaft and the target moment of inertia, and control the electric machine to apply the torque to the shaft.

In other examples, the disclosure describes a non-transitory computer-readable storage medium storing instructions that, when executed, cause a processor to receive a rotational speed of a shaft of an engine coupled to an electric machine. The shaft rotates about an axis of rotation. An engine controller is configured to control the engine using control techniques configured for a mechanical device having a target moment of inertia around the axis of rotation. The instructions further cause the processor to determine a torque for the shaft based on the rotational speed of the shaft and control the electric machine to apply the torque to the shaft. The electric machine has an actual moment of inertia around the axis of rotation, different from the target moment of inertia.

The details of one or more examples are set forth in the accompanying drawings and the description below. Other features, objects, and advantages of the disclosure will be apparent from the description and drawings, and from the claims.

DETAILED DESCRIPTION

Figure 1A:
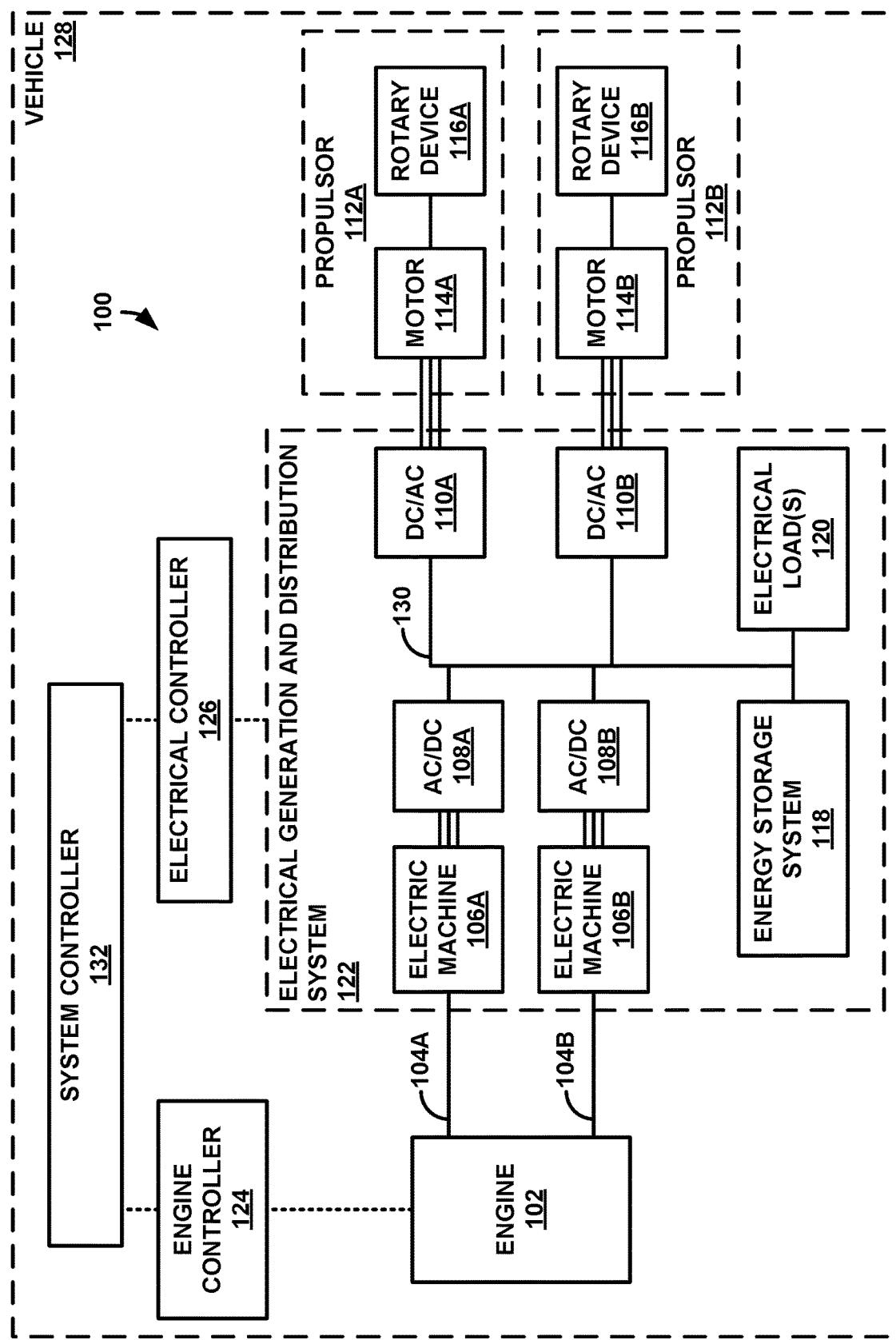
FIG. 1A is a conceptual and schematic block diagram illustrating an example system for electrical power generation, distribution, and propulsion, in accordance with techniques of this disclosure.

The disclosure describes systems and techniques for controlling an electric machine and an engine using an engine controller that has been targeted, designed, and certified for use controlling the engine with a mechanical system that is different than the electric machine. An engine controller, such as a FADEC controller, may be designed or targeted to work with for a specific engine or type of engine that drives a specific thrust generation system or type of thrust generation system that has certain operating behaviors. One such operating behavior of a thrust generation system may be a moment of inertia of a rotating mechanical device, such as a propeller or fan, or other target device being driven by the thrust generation system. This so called "target mechanical device" may be connected to a shaft coupled to, and driven by, the engine. The moment of inertia of the target mechanical device represents the rotational energy that is accumulated during acceleration of the target mechanical device and returned during deceleration of the target mechanical device. During power transients, the engine controller may cause the engine to apply a torque ($\tau_{eng}$) to the shaft based on the anticipated moment of inertia ($J_{md}$) of the target mechanical device to produce a particular angular acceleration ($\dot{\omega}_s$) of the shaft, as expressed in Equation 1 reproduced below:

$$\tau_{eng} = J_{md} \dot{\omega}_s \quad \text{EQ. 1}$$

The applied torque may take into account operating limits, such as a maximum angular acceleration/deceleration, a maximum rotational speed, and/or a maximum variation in the rotational speed, of the shaft that ensure stability and/or enable safe operation of the engine. For example, the engine controller may control the engine to accelerate the shaft at an angular acceleration below a maximum angular acceleration or to operate at a rotational speed that is below a maximum rotational speed.

In a hybrid engine system, the target mechanical device of the engine may be replaced with an electric machine that produces electrical power to drive electrically-driven propulsors. This electric machine may include rotating components, such as a rotor and various gears, that have a moment of inertia that is lower than the moment of inertia of the designed-for mechanical device. If an engine controller configured to control an engine driving the target mechanical device is used to control the engine driving the electric machine, the engine controller may continue to apply a torque to the shaft that corresponds to the higher moment of inertia for the target mechanical device. As a result, the shaft may behave differently in response to the torque applied by the engine, potentially violating angular acceleration/deceleration, rotational speed, and/or safety limits of the engine. To compensate for the difference between the moments of inertia of the target mechanical device and the electric machine, a flywheel may be coupled to the shaft. However, this flywheel may add unnecessary weight to the engine. On the other hand, replacement of the engine controller with another engine controller configured to drive the electric machine may be expensive and/or limit flexibility of the engine for use with other mechanical devices.

According to principles of the disclosure, a system may safely control an engine coupled to an electric machine using an engine controller designed to control a target mechanical device that is different than the electric machine. A system may include an engine and an electric machine coupled to a shaft of the engine. An engine controller may control the engine using control techniques that are adapted for controlling a target mechanical device having a different moment of inertia than the electric machine. An electrical controller may cause the electric machine to apply a torque to the shaft so that the shaft is operated within one or more operating limits of the engine. For example, the applied torque may limit a rotational speed or acceleration of the shaft to below a maximum rotational speed or angular acceleration of the engine and/or simulate the moment of inertia of the mechanical device for which the engine controller was designed. The system may utilize existing electrical power components, such as power converters, electrical loads, and/or energy storage systems, to provide rotational energy to and accept rotational energy from the electric machine, such as by extracting electrical power from the electric machine or supplying electrical power to the electric machine to respectively resist or assist rotation of the shaft.

In this way, the systems and techniques discussed herein may enable inexpensive and efficient control of a power generation system for propulsion. For example, the systems and techniques described herein may enable safe operation of the engine for a different purpose than what the engine and engine controller were designed or targeted. The systems and techniques may enable safe operation of an engine, without recertifying an engine controller or attaching a heavy flywheel to a shaft to simulate the inertia of the target mechanical device that the engine controller and engine were certified for. The systems and techniques described herein may also enable reduced power consumption, as electrical power that is generated during acceleration of the shafts may be used for propulsion or other electrical loads, or may be stored in an energy storage system for use in controlling the engine during deceleration.

FIG. 1 is a conceptual and schematic block diagram illustrating an example electrical power and thrust generation system 100 for a vehicle 128. Vehicle 128 may include any vehicle capable of generating thrust from electrical power. Vehicle 128 may include, but is not limited to: aircraft, such as airplanes; watercraft, such as ships; spacecraft; land vehicles, such as trains; and the like.

Electrical power and thrust generation system 100 (referred to simply as "system 100") may be a distributed propulsion system, such that the electrical power generated by system 100 may be distributed throughout system 100. System 100 includes an engine 102, an engine controller 124, an electrical generation and distribution system 122, an electrical controller 126, and two propulsors 112A and 112B (collectively referred to as "propulsors 112"). Electrical generation and distribution system 122 includes two electric machines 106A and 106B (collectively referred to as "electrical machines 106"), two AC/DC rectifiers 108A and 108B (collectively referred to as "rectifiers 108"), two DC/AC inverters 110A and 110B (collectively referred to as "inverters 110"), an energy storage system 118, and various electrical loads 120. While system 100 is shown as including one of engine 102, one of engine controller 124, one of electrical controller 126, two of propulsors 112, two of electric machines 106, two of rectifiers 108, two of inverters 110, one of energy storage device 118, and a plurality of electrical loads 120, other suitable quantities of each of the aforementioned components may be used in system 100. For example, electrical generation and distribution system 122 may include more or less than two inverters 110, for example, to support additional or fewer than two propulsors 112.

Engine 102 is configured to generate mechanical power from a fuel source and exert a torque on one or more shafts using the mechanical power. For example, engine 102 may receive fuel stored on vehicle 128, such as jet fuel, and combust the fuel to produce the mechanical power. Engine 102 may include, but is not limited to, gas turbine engines, such as turboshaft engines; internal combustion engines; steam turbine engines; steam engines; and the like. In the example of FIG. 1, engine 102 drives shafts 104A and 104B (collectively referred to as "shafts 104") around an axis of rotation. Each of shafts 104 is configured to drive one or more mechanical devices, such as a rotor of a respective electrical machine of electrical machines 106, using the mechanical power supplied by engine 102. For example, shaft 104A may be a high-pressure shaft, while shaft 104B may be a low-pressure shaft. Engine 102 may include instrumentation to provide sensory feedback of operating parameters of engine 102 to engine controller 124 and/or electrical controller 126, such as a rotational speed sensor to detect a rotational speed of each of shafts 104.

Electrical generation and distribution system 122 is configured to receive mechanical power from engine 102, generate electrical power from the mechanical power, and distribute electrical power to propulsors 112, e.g., for thrust generation. Each of electric machines 106 is configured to receive mechanical power from engine 102 through a respective one of shafts 104 and generate alternating current (AC) electrical power from the mechanical power (as opposed to direct current (DC) electrical power). A rotor of each of electric machines 106 may be coupled to a respective shaft of shafts 104, such that engine 102 is configured to provide rotational energy to the rotor of each electric machine 106. Electric machines 106 may include stator windings configured to generate AC electrical power from the rotational energy of the rotor of each of electric machines 106. Electric machines 106 may include, but are not limited to, electrical generators, electric motors, and the like. Electric machine 106 may be configured to produce a torque on each of shafts 104. For example, one or more components of electrical generation and distribution system 122 may be configured to extract electrical power from or supply electrical power to electric machines 106, such as rectifiers 108, inverters 110 energy storage system 118, and/or electrical loads 120.

In the example of FIG. 1, electric machines 106 produce AC electrical power, such as through electromagnetic forces on the stator windings of electric machines 106. However, certain electrical components of system 10 may utilize DC electrical power, such as that derived from energy storage system 118 and electrical loads 120. To receive DC electric power from and/or supply DC electric power to these components, system 122 may include one or more power converters, such as rectifiers 108 and inverters 110, electrically coupled to each other through DC bus 130. Rectifiers 108 may each be configured to convert AC power from a respective one of electric machines 106 to DC electric power for DC bus 130. Inverters 110 may be configured to convert DC electric power from DC bus 130 to AC electric power for a respective one of propulsors 112.

Operation of any of rectifiers 108 and/or inverters 110 may affect an amount of torque exerted on shafts 104 by electric machines 106, such as through extraction of electrical power from electric machine 106. In some examples, rectifiers 108 and/or inverters 110 may include instrumentation to provide, to electrical controller 126, feedback of operating parameters (e.g., voltage, current, rotational speed, frequency, phase, etc.) of rectifiers 108 and/or inverters 110, such as a temperature sensor to detect a temperature of one of rectifiers 108 or inverters 110 or temperature of a cooling system of one of rectifiers 108 or inverters 110.

Each of propulsors 112 includes a corresponding motor 114A and 114B (collectively referred to as "motors 114") and a corresponding rotary device 116A and 116B (collectively referred to as "rotary devices 116"). Motors 114 are configured to receive AC electrical power from inverters 110 and convert the AC electrical power to rotational mechanical power. For example, each of motors 114 is electrical coupled to one of inverters 110 and configured to receive AC electrical power from the respective one of inverters 110. In some examples, motors 114 may include instrumentation to provide sensory feedback of operating parameters (e.g., voltage, current, rotational speed, frequency, phase, etc.) of motors 114 to engine controller 124 and/or electrical controller 126, such as a rotational speed sensor to detect a rotational speed of each of the shaft coupling one of motors 114 to a respective one of rotary devices 116. Rotary devices 116 are configured to convert rotational mechanical power to thrust to drive vehicle 128. Rotary devices that may be used include, but are not limited to, propellers, propulsive fans, rotors, and the like. While each of motors 114 is shown electrically coupled to a respective one of inverters 110, in some examples, two or more of motors 114 may be electrically coupled to each of inverters 110. For example, one of inverters 110 may drive multiple motors 114, such that each of motors 114 may be synchronized. In some examples, some of motors 114 may be driven by one of inverters 110, such as to provide bulk thrust, while others of inverters 110 may each be individually driven by one of inverters 110, such as to provide directional control.

Electrical loads 120 correspond to one or more components of vehicle 128 that use electrical power generated by system 100. For example, electrical loads 120 are electrically coupled to rectifiers 108 and configured to receive DC electrical power from rectifiers 108. Electrical loads 120 may be components used for mechanical power, electrical power, and/or thrust generation, such as engine and/or inverter cooling systems, or may be components of auxiliary systems, such as environmental control systems. Operation of electrical loads 120 may affect an amount of torque exerted on shafts 104 by electric machines 106, such as through extraction of electrical power from electric machine 106.

Energy storage system 118 is configured to store electrical power from electric machines 106 and/or other electrical generation components of vehicle 128 and discharge electrical power to inverters 110, rectifiers 108, and/or electrical loads 120. For example, energy storage system 118 is electrically coupled to DC bus 130 and configured to receive DC electrical power from and/or supply DC electrical power to DC bus 130. Energy storage systems that may be used include, but are not limited to, batteries, flywheels, and the like. Operation of energy storage system 118 may affect an amount of torque exerted on shafts 104 by electric machines 106, such as through flow of electrical power between energy storage system 118 and electric machines 106.

In some examples, as shown in FIG. 1, system 100 may be a series hybrid electric propulsion system. For example, system 100 may generate electrical power using engine 102 and supply electrical power to propulsors 112 using either or both of electrical power stored in a battery and/or electrical power generated directly from engine 102. In some examples, system 100 may be a turboelectric system, such as having a plurality of engines 102 generating power to a common DC bus 130.

System 100 includes engine controller 124, electrical controller 126, and system controller 132. Each of controller 124, controller 126, and controller 132 may include any of a wide range of devices, including processors (e.g., one or more microprocessors, one or more application specific integrated circuits (ASICs), one or more field programmable gate arrays (FPGAs), or the like), one or more servers, one or more desktop computers, one or more notebook (i.e., laptop) computers, one or more cloud computing clusters, or the like. While engine controller 124, electrical controller 126, and system controller 132 is shown as including difference controllers, any number of controllers and control modules may be used to perform the functions of controllers 124, 126, and 132.

System controller 132 is configured to control high-level operation of system 100. For example, system controller 132 may include a user interface for receiving throttle commands or other power requests from user controls, e.g., being manipulated by a pilot or other operator of vehicle 128. System controller 132 may be configured to send power request signals to engine controller 124, system state signals to engine controller 124 and/or electrical controller 126, operating limit signals to engine controller 124 and/or electrical controller 126, and component information, such as moments of inertia of electrical machines 106 and/or target mechanical components of engine controller 124, to electrical controller 126, as will be described further below.

Electrical controller 126 is configured to control operation of components of electrical power generation and distribution system 122 for vehicle 128. For example, electrical controller 126 may be configured to control any components of electrical generation and distribution system 122, such as electric machines 106, rectifier 108, inverters 110, energy storage system 118, and/or electrical loads 120. In some examples, electrical controller 126 may be configured to receive feedback from components of system 122, such as rotational speeds of shafts 104, temperatures of power converters 108 and 110, and the like. While electrical controller 126 is shown as being a centralized module, functions and portions of electrical controller 126 may be distributed throughout system 122. For example, electrical controller 126 may include power electronics and/or control circuitry in rectifiers 108, inverters 110, energy storage system 118, and/or electrical loads 120.

Engine controller 124 is configured to control operation of engine 102. For example, engine controller 124 may be configured to receive a power demand signal from a user or machine interface, generate one or more control signals based on the power demand signal, and control one or more actuators, such as a fuel valve, to control a power of engine 102 that corresponds to the power demand signal. The control signals may be configured based on operating characteristics of engine 102 and anticipated operating characteristics of various components for which engine 102 may be mechanically coupled.

Figure 1B:
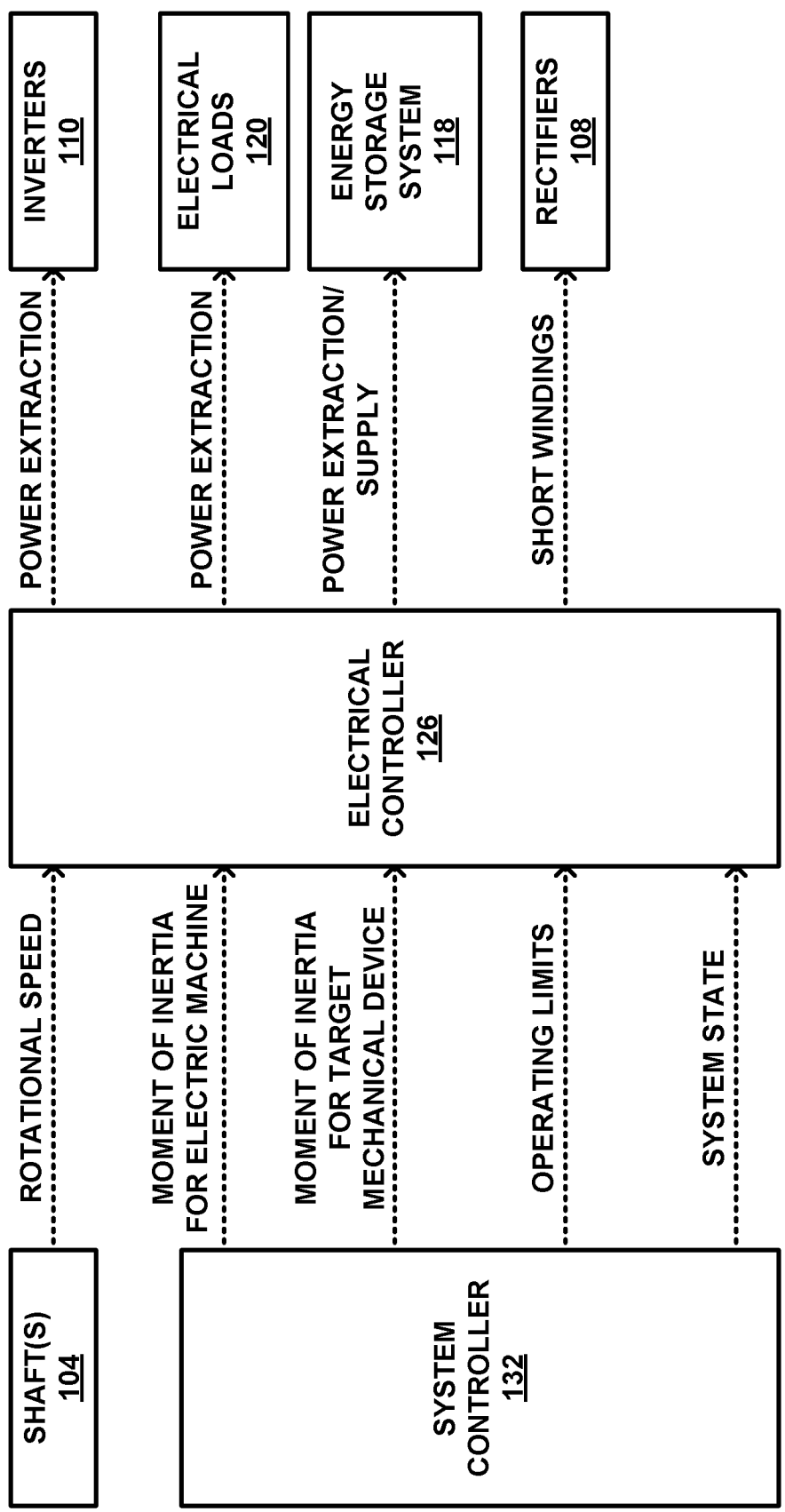
FIG. 1B is a conceptual and schematic block diagram illustrating an example electrical controller for controlling an electric machine, in accordance with techniques of this disclosure.

Engine controller 124 is configured to control engine 102 using control techniques configured for a target mechanical device having a respective moment of inertia that is different from a respective moment of inertia of rotary components of electric machines 106. For example, engine controller 124 may be configured to control engine 102 to drive a propulsive fan of an airplane, a propeller of a ship, a rotor of a helicopter, or other target mechanical device that has a different moment of inertia than rotary components of electric machines 106. Due to this difference in respective moments of inertia between the target mechanical device and the rotary components of electric machines 106, if engine controller 124 were to function normally, i.e., as if engine controller 124 were controlling the target mechanical device even though engine controller 124 is being used to control the rotary components of electric machines 106, engine controller 124 may cause engine 102 to operate in an unstable manner. To mitigate any instability in engine 102, electrical controller 126 may adjust electrical machines 106 as a way to simulate the operating conditions of the target mechanical machines 106, even though the rotary components of electric machines 106 may not themselves induce such operating conditions on their own. FIG. 1B is a schematic diagram of electrical controller 126 configured to control electrical power and distribution system 122 of FIG. 1A, according to embodiments of the disclosure.

Electrical controller 126 is configured to receive a signal representing a rotational speed of shafts 104. Engine 102 may include instrumentation or sensors for detecting the rotational speed of shafts 104. Electrical controller 126 may be configured to receive, such as directly from the instrumentation of shafts 104 or indirectly from engine controller 124, the rotational speeds of shafts 104. As will be explained below, the rotational speed of shafts 104, as well as other operating parameters derived from the rotational speed(s) of shafts 104, may be used to control operation of engine 102 within operating limits and/or to simulate inertia of engine 102 for the target mechanical device.

In some examples, electrical controller 126 may be configured to receive a signal representing the moment of inertia for the target mechanical device for which engine controller 124 is configured and/or the moment of inertia of the rotary components of electric machines 106. The respective moment of inertia may be related to mass distribution of the target mechanical device and the rotary components of electric machines 106. In some examples, electrical controller 126 may receive inertial forces that take into account an angular acceleration of each of the target mechanical device and rotary components of electrical machines 106. For example, electrical controller 126 may receive fixed or scheduled inertias for each of engine 102 and electric machines 106 based on the angular acceleration of shafts 104. The moments of inertia or inertial forces for each of the target mechanical device and the rotary components of electrical machines 106 may be received in real-time, such as from system controller 132 during operation of engine 102, or may be received prior to operation of engine 102, such as from a calibration computer, stored in memory on electrical controller 126, and recalled during operation of engine 102.

In some examples, electrical controller 126 may be configured to determine operating limits of engine 102. For example, engine 102 and/or engine controller 124 may have various limits on measured and/or unmeasured operating parameters associated with operation of engine 102 or an ability of engine controller 124 to operate engine 102. Operating limits may include, but are not limited to, a maximum rotational speed of shafts 104, a minimum rotational speed of shafts 104, a maximum angular acceleration of shafts 104, a maximum variation in rotational speeds of shafts 104, a maximum vibration (i.e. oscillation in speed) of shafts 104, and/or a maximum amount of time in a range of rotational speeds of shafts 104 (e.g., 5 seconds for operating within 6000 to 8000 rpm for a target of 5500 rpm), and the like. In some examples, electrical controller 126 may be configured to select operating limits based on rotational speed of shafts 104. For example, an operating limit for angular acceleration may be higher at low rotational speeds than at nominal rotational speeds due to an ability of engine controller 124.

In some examples, electrical controller 126 may be configured to determine a system state of system 100. For example, vehicle 128 may have various system states that have different associated operating characteristics, such as operating limits and control techniques. As such, electrical controller 126 may be configured to take into account the system state when controlling electric machines 106. In some examples, electrical controller 126 may be configured to select operating limits based on the system state. For example, electrical controller 126 may receive a system state indicating an emergency stop and select a maximum angular acceleration based on the emergency stop that is higher than a maximum angular acceleration at a non-emergency system state to enable faster braking. System states may include, but are not limited to, emergency starting, emergency stopping, take-off, landing, steady-state, and the like.

Electrical controller 126 is configured to determine a torque for the shaft based on the rotational speed of the shaft and/or operating parameters derived from the rotational speed of the shaft, as well as any of the moments of inertia of the target mechanical device and electric machines 106, the system state of system 100, and the operating limits of engine 102. The torque may be determined and selected so that the operation of engine 102 approximates an operation of engine 102 with the target mechanical device and/or the operation of engine 102 stays within operating limits.

As one example, electrical controller 126 may be configured to determine a torque that will limit operation of engine 102 to within operating limits of engine 102. For example, electrical controller 126 may be configured to determine, prior to determining the torque for the shaft, that at least one of the rotational speed of shafts 104, an angular acceleration of shafts 104, or a variation in the rotational speed of shafts 104 exceeds an operating limit. As a result, electrical controller 126 may be configured to limit the torque for the shaft to at least one of a maximum rotational speed of the shaft, a maximum angular acceleration of the shaft, or a maximum variation in the rotational speed of the shaft.

As another example, electrical controller 126 may be configured to determine a torque that will simulate inertia of the target mechanical device. To simulate the inertia, electrical machine 126 may be configured to determine the torque for one of shafts 104 based on the rotational speed of the one of shafts 104 and a difference between the moment of inertia of the respective one of electric machines 106 and the moment of inertia of the target mechanical device.

Further operation of electrical controller 126 to determine a torque will be described in FIGS. 2A and 2B below.

Electrical controller 126 is configured to control the electric machine to apply the torque to the shaft using various components of electrical generation and distribution system 122. For example, as power is extracted from electric machines 106 by components of system 122, electric machine 106 may exert a torque on a respective one of shafts 104 that resists rotation; conversely, as power is supplied to electric machines 106 from components of system 122, electric machine may exert a torque on a respective one of shafts 104 that assists in rotation. The electrical power extracted from electric machines 106 may be stored, used, and/or dissipated by components of system 122, while the power supplied to electric machines 106 may be used and/or dissipated by components of electric machine 106. As shown in FIG. 1B, electrical controller 126 is configured to send control signals to any of rectifiers 108, inverters 110, propulsors 112, energy storage system 118, and/or electrical loads 120.

In some examples, electrical controller 126 is configured to control an amount of power being extracted from one of electric machines 106 and delivered to propulsors 112 electrically coupled to electric machines 106 to create the torque on shafts 104. For example, electric machines 106 are electrically coupled to motors 114 through inverters 110, such that electrical controller 126 may be configured to control power extraction from electric machines 106 to motors 114 using inverters 110. For example, electrical controller 126 may send control signals to inverters 110 to increase or decrease electrical power extracted from inverters 110, and thus increase thrust from propulsors 112. For example, in systems in which the moment of inertia of the target mechanical device is greater than the rotary components of electric machines 106, the rotary components of electric machines 106 may accelerate faster than anticipated by engine controller 124 and decelerate slower than anticipated by engine controller 124. As such, during acceleration of shafts 104, electrical controller 126 may be configured to increase the amount of power being extracted from electric machines 106 to inverters 110, thereby increasing the torque and, correspondingly, increasing the simulated inertia and/or maintaining operation of engine 102 within an operating limit. During deceleration of shafts 104, electrical controller 126 may decrease the amount of power being extracted from electric machines 106 to inverters 110, thereby decreasing the torque and, correspondingly, decreasing the simulated inertia and/or maintaining operation of engine 102 within an operating limit.

In some examples, electrical controller 126 is configured to control an amount of power being extracted from one of electric machines 106 and delivered to one or more electric loads 120 electrically coupled to electric machines 106 to create the torque on shafts 104. For example, electrical controller 126 may send control signals to electrical loads 120 to increase or decrease electrical power extracted from electrical loads 120. In some examples, electrical controller 126 may be configured to adjust the amount of power being extracted from electric machines 106 and delivered to the one or more electrical loads 120, such as by sending control signals to electrical loads 120. During acceleration of shafts 104, electrical controller 126 may be configured to increase the amount of power being extracted from electric machines 106 to electric loads 120, thereby increasing the torque and, correspondingly, increasing the simulated inertia and/or maintaining operation of engine 102 within an operating limit. During deceleration of shafts 104, electrical controller 126 may decrease the amount of power being extracted from electric machines 106 to electric loads 120, thereby decreasing the torque and, correspondingly, decreasing the simulated inertia and/or maintaining operation of engine 102 within an operating limit.

In some examples in which electric machine 106 is electrically coupled to energy storage system 118, electrical controller 126 may be configured to adjust an amount of electrical power drawn by electric machine 106 from energy storage system 118. For example, electrical controller 126 may send control signals to energy storage system 118 to increase or decrease electrical power extracted from energy storage system 118. During acceleration of shafts 104, electrical controller 126 may be configured to extract power from electric machines 106 to energy storage system 118, thereby increasing the torque and, correspondingly, increasing the simulated inertia and/or maintaining operation of engine 102 within an operating limit. During deceleration of shafts 104, electrical controller 126 may supply power from energy storage system 118 to electric machines 106 or reduce electrical power extracted from electric machines 106 to energy storage system 118, thereby decreasing the torque and, correspondingly, decreasing the simulated inertia and/or maintaining operation of engine 102 within an operating limit. In this way, energy storage system 118 may conserve electrical power by acting as a buffer for acceleration and deceleration of shafts 104, such as by extracting electrical power from engine 102 during acceleration, storing the electrical power during steady state, and returning the electrical power to engine 102 during deceleration.

In some examples, electrical controller 126 may be configured to control electric machines 106 to apply the torque to shafts 104 by controlling rectifiers 108 to short motor phase windings of electric machines 106. For example, each of electric machines 106 and/or motors 114 includes motor phase windings electrically coupled to a respective one of rectifiers 108 and/or inverters 110 (collectively referred to as "power converters 108/110"). During a short of the motor phase windings, the motor phase windings may dispose of electrical power by extracting electrical power and convert the electrical power to thermal energy. This thermal energy may be removed by a cooling system, an exhaust system, or other cooling medium system, which acts as a heat sink for the dissipated thermal energy. During acceleration of shafts 104, electrical controller 126 is configured to control rectifiers 108 to short the motor phase windings of respective electric machines 106, thereby increasing the torque and, correspondingly, increasing the simulated inertia and/or maintaining operation of engine 102 within an operating limit.

In some examples, rectifiers 108 may include redundancies, such that each of electric machines 106 includes a plurality of rectifiers 108, or other redundancies. As such, electrical controller 126 may be configured to control rectifiers 108 to short the motor phase windings of electric machines 106 based on different applied torques. For example, electrical controller 126 may control each rectifier of the plurality of rectifiers in a hierarchy, such that electrical controller 126 may cause a first rectifier to apply a torque to one of shafts 104, while electrical controller 126 may cause a second rectifier to apply a torque to the one of shafts 104 if the first rectifier fails, reaches a torque limit, or reaches a temperature limit. As such, electrical controller 126 may receive feedback from rectifiers 108 regarding health of rectifiers 108, such as temperatures of rectifiers 108, and/or feedback that may indicate failure or saturation of rectifiers 108, such as an increase in rotational speed of shafts 104, an increase in angular acceleration of shafts 104, or an increase in variation of rotational speed of shafts 104. In some examples, electrical controller 126 may be configured to cause the plurality of rectifiers 108 to apply a torque at different operating limits, such as different maximum rotational speeds.

Figure 2A:
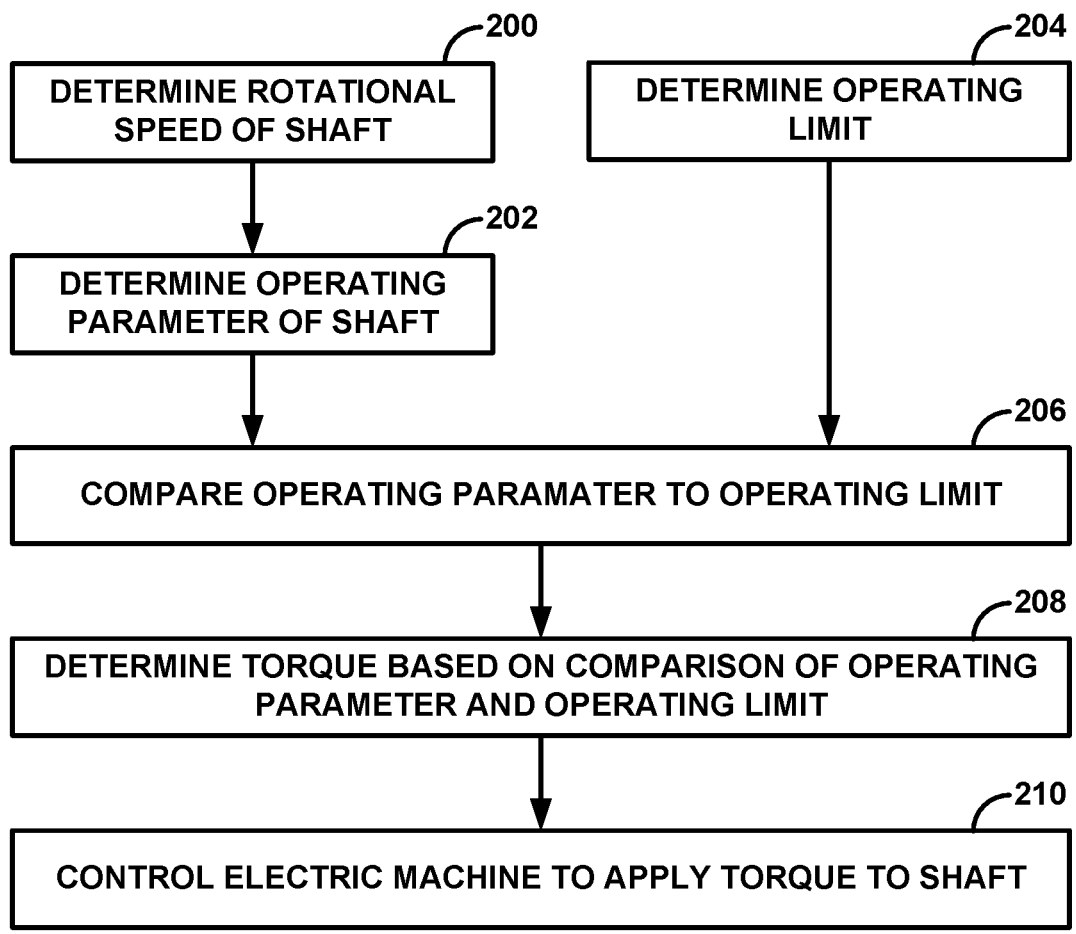
FIG. 2A is a flow diagram illustrating example operations performed by an example electric controller of an electric machine to maintain operation of an engine within operating limits, in accordance with techniques of this disclosure.
Figure 2B:
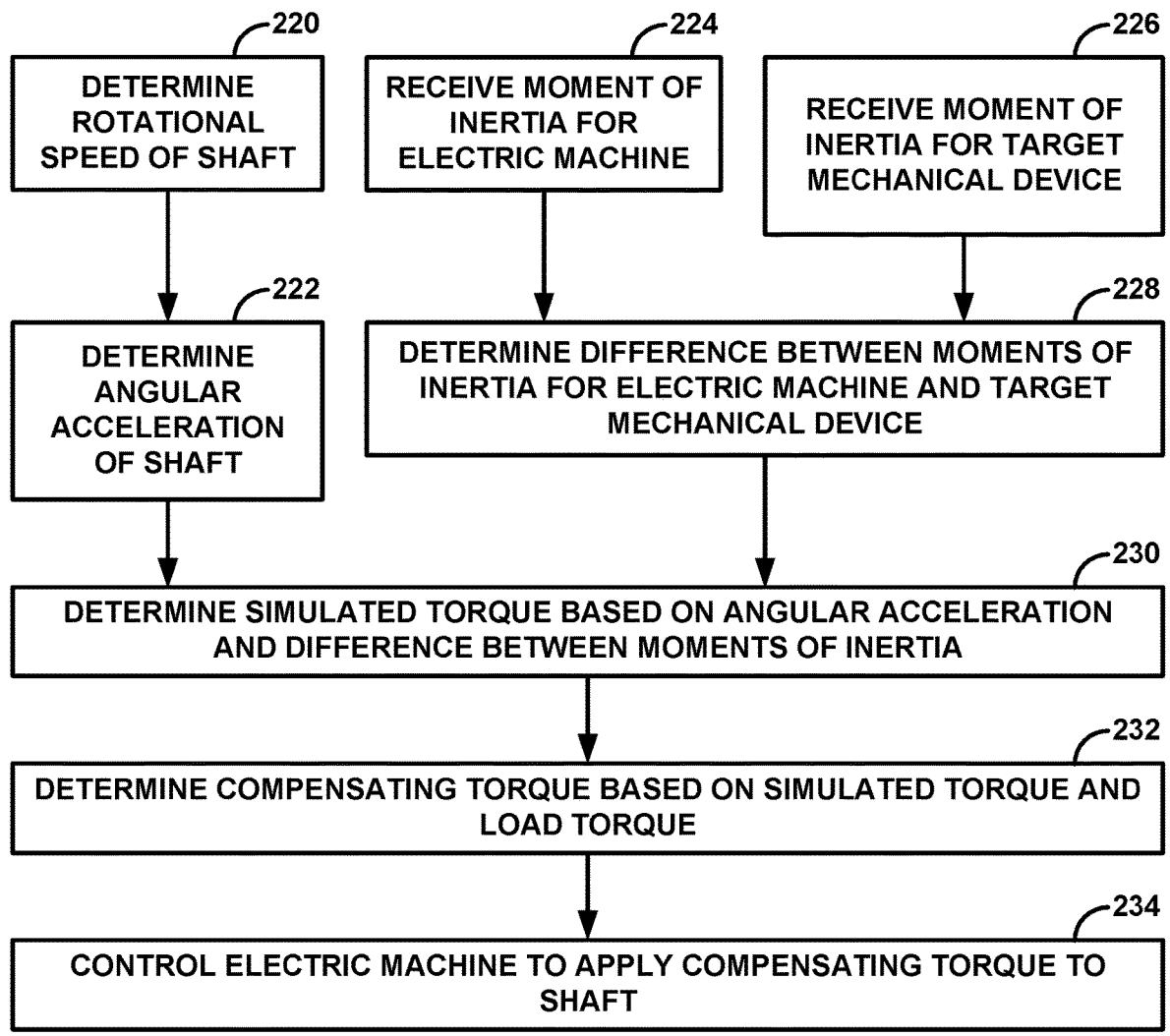
FIG. 2B is a flow diagram illustrating example operations performed by an example electric controller of an electric machine to simulate inertia of an engine, in accordance with techniques of this disclosure.

FIGS. 2A and 2B are flow diagrams illustrating example techniques for controlling an electric machine to assist in control of engine 102. The techniques of FIGS. 2A and 2B will be described with concurrent reference to system 100 of FIG. 1, although one of ordinary skill will understand that the techniques of FIGS. 2A and 2B may be performed by other systems that include more or fewer components, and that system 100 may perform other techniques.

FIG. 2A is a flow diagram illustrating example operations performed by an example electric controller of an electric machine to maintain operation of an engine within operating limits, in accordance with techniques of this disclosure. Electrical controller 126 may determine a rotational speed of shaft 104A (200). For example, electrical controller 126 may receive a signal representing the rotational speed of shaft 104A from engine controller 124 or a sensor on shaft 104A and determine the rotational speed of shaft 104A from the received signal. In some examples, electrical controller 126 receives a plurality of rotational speeds of shaft 104A, such as in real-time or at regular intervals.

Electrical controller 126 may determine one or more operating parameters from the rotational speed of shaft 104A (202). For example, electrical controller 126 may determine an angular acceleration of shaft 104A and/or a degree of oscillation of the rotational speed of shaft 104A based on two or more measurements of the rotational speed of shaft 104A over a period of time.

Electrical controller 126 may determine an operating limit of shaft 104A (204). For example, electrical controller 126 may receive a signal representing a maximum rotational speed of shaft 104A, a maximum angular acceleration of shaft 104A, and/or a maximum degree of oscillation of the rotational speed of shaft 104A. In some examples, electrical controller 126 may receive the operating limit based on a system state of system 100. For example, while system 100 is at a system state corresponding to engine 102 operating at a range of rotational speeds, electrical controller 126 may receive a signal representing an operating limit for system 100 at the range of rotational speeds. In some examples, electrical controller 126 receives one or more operating limits of shaft 104A prior to operation of engine 102 and stores the one or more operating limits in a memory of electrical controller 126.

Electrical controller 126 may compare the operating parameter to the operating limit (206). For example, electrical controller 126 may compare any of the rotational speed of shaft 104A, the angular acceleration of shaft 104A, and/or the degree of oscillations of shaft 104A to a respective maximum rotational speed of shaft 104A, maximum angular acceleration of shaft 104A, and/or maximum degree of oscillation of the rotational speed of shaft 104A.

Electrical controller 126 may determine a torque based on the comparison of the operating parameter to the operating limit (208). For example, electrical controller 126 may determine whether the operating parameter of shaft 104A exceeds the operating limit of shaft 104A. If the operating parameter does not exceed the operating limit, electrical controller 126 may determine that no additional torque should be applied to shaft 104A by electric machine 106. However, if the operating parameter exceeds the operating limit, electrical controller 126 may determine a torque that will limit the operating parameter. For example, if electrical controller 126 determines that the rotational speed of shaft 104A exceeds the maximum rotational speed of shaft 104A, electrical controller 126 may determine a torque that will limit the rotational speed of shaft 104A, such as below the maximum rotational speed. In some examples, the torque determined by electrical controller 126 may be a change in torque, such as an increase or decrease in torque, based on whether the operating parameter exceeded a maximum or minimum operating limit. For example, electrical controller 126 may determine an increase in torque based on the rotational speed of shaft 104A exceeding the maximum rotational speed of shaft 104A. In some examples, electrical controller 126 may determine the torque based on a difference between the operating parameter and the operating limit, such as by using PID process control techniques.

Electrical controller 126 may control electric machine 106A to apply the determined torque to shaft 104A (210). In some examples, electrical controller 126 may send a control to any components of electrical generation and distribution system 122 to increase or decrease the torque applied to shaft 104A by electric machine 106A, such that electric machine 106A applies the torque to shaft 104A. For example, if the determined torque is intended to reduce a rotational speed of shaft 104A to below the maximum rotational speed of shaft 104A, electrical controller 126 may control components of system 122 to produce the torque on shaft 104A by sending a control signal to electrical loads 120 to extract more electrical power from electric machine 106A, sending a control signal to inverters 110 and/or propulsors 112 to extract and store more electrical power from electric machine 106A, sending a control signal to energy storage system 118 to extract and store more electrical power from electric machine 106A, and/or send a control signal to rectifier 108A and/or inverters 110 to short motor phase windings in a respective electric machine 106A and/or motors 114. In response to receiving the applied torque, shaft 104A may have a reduced operating parameter within the operating limit.

FIG. 2B is a flow diagram illustrating example operations performed by an example electric controller of an electric machine to simulate inertia of an engine, in accordance with techniques of this disclosure. Electrical controller 126 may determine a rotational speed of shaft 104A (220). For example, electrical controller 126 may receive a signal representing the rotational speed of shaft 104A from engine controller 124 or a sensor on shaft 104A. In some examples, electrical controller 126 receives a plurality of rotational speeds of shaft 104A, such as in real-time or at regular intervals. For example, a change in rotational speeds may indicate an angular acceleration of shaft 104A.

Electrical controller 126 may determine an angular acceleration of shaft 104A based on the rotational speed of shaft 104 (222). For example, electrical controller 126 may determine the angular acceleration of shaft 104A based on two or more measurements of the rotational speed of shaft 104A over a period of time.

Electrical controller 126 may determine a moment of inertia for electric machine 106A (224) and a moment of inertia for a target mechanical device for which engine controller 124 is configured to control (226). For example, electrical controller 126 may receive one or more signals representing a moment of inertia of electric machine 106A and a moment of inertia of the target mechanical device. In some examples, electrical controller 126 receives the moments of inertia prior to operation of engine 102 and stores the moments of inertia in a memory of electrical controller 126.

Electrical controller 126 may determine a difference between the moment of inertia of electric machine 106A and the moment of inertia of the target mechanical device (228). Electrical controller 126 determines a simulated torque based on the rotational speed of shaft 104A and the difference between the moment of inertia of electric machine 106A and the moment of inertia of the target mechanical device (230). The simulated torque represents the torque that electric machine 106A would supply to shaft 104A to supplement the inertia of electric machine 106A and simulate the inertia of the target mechanical device. For example, electrical controller 126 may calculate or look-up a scheduled torque value based on the difference between the moment of inertia of electric machine 106A and the moment of inertia of the target mechanical device and the determined angular acceleration of shaft 104A. As a result, electrical controller 126 may determine the simulated torque ($\tau_{sim}$) that represents a difference between the moment of inertia of the target mechanical device ($J_{md}$) and the moment of inertia of the electric machine 106A ($J_{em}$) for an angular acceleration ($\dot{\omega}_s$), as in Equation 2 shown below:

$$\tau_{sim} = (J_{md} - J_{em})\dot{\omega}_s \quad \text{EQ. 2}$$

Electrical controller 126 may determine a compensating torque based on the simulated torque and a load torque of components of system 122 (232). The load torque may represent the torque created by extraction of electrical power by components of system 122, such as electrical power for propulsors 112, energy storage system 118, and/or electrical loads 120, during operation of system 100. Electrical controller 126 is already applying this load torque to shaft 104A for operation of the components of system 122, such as propulsion. As a result, electrical controller 126 may apply the compensating torque ($\tau_{comp}$) to shaft 104A that represents a difference between the simulated torque ($\tau_{sim}$) and a currently-supplied load torque ($\tau_{load}$), as in Equation 3 shown below:

$$\tau_{comp} = \tau_{sim} - \tau_{load} \quad \text{EQ. 3}$$

Electrical controller 126 may control electric machine 106A to apply the determined torque to shaft 104A (234). In some examples, electrical controller 126 may send a control signal to any components of electrical generation and distribution system 122 to increase or decrease the torque on electric machine 106A, such that electric machine 106A applies the torque to shaft 104A. For example, if the determined torque is intended to increase a simulated inertia for engine controller 124, such as during acceleration, electrical controller 126 may send a control signal to electrical loads 120 to extract more electrical power from electric machine 106A, send a control signal to inverters 110 and/or propulsors 112 to extract more electrical power from electric machine 106A, send a control signal to energy storage system 118 to extract and store more electrical power from electric machine 106A, and/or send a control signal to rectifier 108A and/or inverters 110 to short motor phase windings in a respective electric machine 106A and/or motors 114.

While FIGS. 2A and 2B include techniques for each of controlling operation of engine 102 within operating limits and simulating inertia of a target mechanical device, respectively, the techniques of FIGS. 2A and 2B may both be used to determine and apply a torque to electric machines 106 to control operation of engine 102. In some examples, electrical controller 126 may control electric machine 106A to apply a torque to shaft 104A that simulates inertia of the target mechanical device while maintaining operating parameters within operating limits. For example, engine controller 124 may operate engine 102 at an approximately constant rotational speed (i.e., within a maximum variation of the rotational speed) of shaft 104A and increasing or decreasing a torque on shaft 104A based on a respective increase or decrease in electrical power extraction from electric machine 106A. During these increases or decreases in torque, electrical controller 126 may simulate inertia of the target mechanical device, as in FIG. 2B, while monitoring the rotational speed of shaft 104A. Additionally, if electrical controller 126 detects that engine controller 124 is not maintaining the rotational speed of shaft 104A within the maximum variation of the rotational speed, electrical controller 126 may increase a torque applied to shaft 104A to stabilize operation of engine controller 124. As such, electrical controller 126 may use the techniques of FIGS. 2A and 2B to assist in control of engine 102 both during transients and during steady state.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. For example, an article of manufacture may include a computer-readable storage medium storing instructions that, when executed, cause a processor to receive a representation of a three-dimensional geometry of a preform. The instructions may further cause a processor to determine a set of dimensions of the preform from the representation of the preform and determine dimensions of at least one insert for a fixed tooling based on a dimensional tolerance of the preform, the set of dimensions of the preform, and dimensions of the fixed tooling. The instructions may further cause a processor to control an insert fabrication unit to manufacture the at least one insert based on the determined dimensions.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method, comprising:
   determining, by an electrical controller, a rotational speed of a shaft of an engine coupled to an electric machine, wherein the shaft rotates about an axis of rotation, and wherein an engine controller is configured to control the engine using control techniques configured for a mechanical device having a target moment of inertia around the axis of rotation;
   determining, by the electrical controller, a torque for the shaft based on the rotational speed of the shaft and a difference between the target moment of inertia and an actual moment of inertia; and
   controlling, by the electrical controller, the electric machine to apply the torque to the shaft, wherein the electric machine has the actual moment of inertia around the axis of rotation, different from the target moment of inertia.

2. The method of claim 1, further comprising determining, prior to determining the torque for the shaft, that at least one of the rotational speed of the shaft, an angular acceleration of the shaft, or a variation in the rotational speed of the shaft exceeds an operating limit.

3. The method of claim 1, wherein controlling the electric machine to apply the torque to the shaft comprises limiting, by the electrical controller, the torque for the shaft to at least one of a maximum rotational speed of the shaft, a maximum angular acceleration of the shaft, or a maximum variation in the rotational speed of the shaft.

4. The method of claim 1, wherein controlling the electric machine to apply the torque further comprises applying the torque to the shaft by at least adjusting an amount of power being extracted from the electric machine and delivered to one or more electric loads electrically coupled to the electric machine to create the torque on the shaft.

5. The method of claim 4, wherein adjusting the amount of power being extracted from the electric machine and delivered to the one or more electric loads further comprises at least one of:
   increasing the amount of power being extracted during acceleration of the shaft; and
   decreasing the amount of power being extracted during deceleration of the shaft.

6. The method of claim 1, wherein the electric machine is electrically coupled to an energy storage system, and wherein controlling the electric machine to apply the torque further comprises adjusting an amount of power flowing between the electric machine and the energy storage system.

7. The method of claim 6, wherein adjusting the amount of power flowing between the electric machine and the energy storage system further comprises at least one of:
   extracting power from the electric machine during acceleration of the shaft; and
   supplying power to the electric machine during deceleration of the shaft.

8. The method of claim 1, wherein the electric machine is electrically coupled to one or more motors through one or more inverters, and wherein controlling the electric machine to apply the torque further comprises controlling power extraction from the electric machine to the one or more motors using the one or more inverters.

9. The method of claim 1, wherein the electric machine comprises motor phase windings electrically coupled to one or more power converters, and wherein controlling the electric machine to apply the torque further comprises controlling the power converters to short the motor phase windings during acceleration of the shaft.

10. The method of claim 1, further comprising operating, by the engine controller, the engine based on the control techniques.

11. A system, comprising:
    an engine comprising a shaft, wherein the shaft rotates around an axis of rotation;
    an engine controller configured to control the engine using control techniques configured for a mechanical device having a target moment of inertia around the axis of rotation;
    an electric machine coupled to the shaft, wherein the electric machine has an actual moment of inertia around the axis of rotation, different from the target moment of inertia; and
    an electrical controller configured to:
      receive a rotational speed of the shaft;
      determine a torque for the shaft based on the speed of the shaft and a difference between the target moment of inertia and the actual moment of inertia ; and
      control the electric machine to apply the torque to the shaft.

12. The system of claim 11, wherein the electrical controller is configured to determine, prior to determining the torque for the shaft, that at least one of the rotational speed of the shaft, an angular acceleration of the shaft, or a variation in the rotational speed of the shaft exceeds an operating limit.

13. The system of claim 11, wherein the electrical controller is further configured to apply torque to the shaft to limit at least one of a maximum rotational speed of the shaft, a maximum angular acceleration of the shaft, or a maximum variation in the rotational speed of the shaft.

14. The system of claim 11, wherein the electrical controller is further configured to apply the torque to the shaft by at least adjusting an amount of power being extracted from the electric machine and delivered to one or more electric loads electrically coupled to the electric machine to create the torque on the shaft.

15. The system of claim 11, wherein the electric machine is electrically coupled to an energy storage system, and wherein the electrical controller is further configured to adjust an amount of power flowing between the electric machine and the energy storage system.

16. The system of claim 11, wherein the electric machine is electrically coupled to one or more motors through one or more inverters, and wherein the electric machine is further configured to control power extraction from the electric machine to the one or more motors using the one or more inverters.

17. The system of claim 11, wherein the electric machine comprises motor phase windings electrically coupled to one or more power converters, and wherein the electrical controller is further configured to control the power converters to short the motor phase windings during acceleration of the shaft.

18. A non-transitory computer-readable storage medium storing instructions that, when executed, cause a processor to:
receive a rotational speed of a shaft of an engine coupled to an electric machine, wherein the shaft rotates about an axis of rotation, and wherein an engine controller is configured to control the engine using control techniques configured for a mechanical device having a target moment of inertia around the axis of rotation;
determine a torque for the shaft based on the rotational speed of the shaft and a difference between the target moment of inertia and an actual moment of inertia; and
control the electric machine to apply the torque to the shaft, wherein the electric machine has the actual moment of inertia around the axis of rotation, different from the target moment of inertia.

\* \* \* \* \*